UNITED STATES PATENT OFFICE.

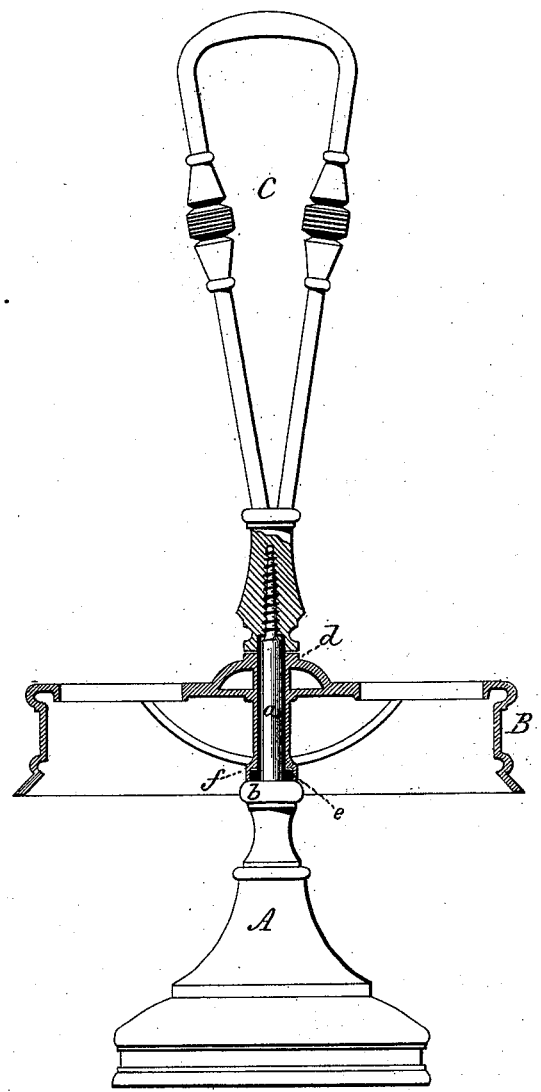

HENRY B. BEACH AND EDGAR B. BEACH, OF WEST MERIDEN, CONNECTICUT.

IMPROVEMENT IN TABLE-CASTERS.

Specification forming part of Letters Patent No. 210,234, dated November 26, 1878; application filed October 26, 1878.

*To all whom it may concern:*

Be it known that we, HENRY B. BEACH and EDGAR B. BEACH, of West Meriden, in the county of New Haven and State of Connecticut, have invented a new Improvement in Table-Casters; and we do hereby declare the following, when taken in connection with the accompanying drawings and the letters of reference marked thereon, to be a full, clear, and exact description of the same, and which said drawing constitutes part of this specification, and represents a sectional side view.

This invention relates to an improvement in table-casters, and like articles in which a revolving carrier is employed to support bottles or other articles, so that the carrier may be turned for the convenience of persons who may desire to take one of the bottles or articles from the carrier.

As usually constructed, a revolving carrier has been arranged upon a central spindle, and so that the metal of the carrier would run directly in contact with the metal of the spindle and base. Owing to the soft nature of this metal and the inconvenience of lubrication, the metal quickly wears away, and as the friction is great between the two metals, turning the ring causes it to "chatter," producing a disagreeable sound, as well as the serious jarring of the articles on the carrier.

To overcome this difficulty is the prime object of this invention; and it consists in the construction, as hereinafter described, and more particularly recited in the claims.

A is the base of the caster; $a$, the spindle, forming a shoulder, $b$, at its junction with the base; B, the rotary carrier, set on over the spindle; C, the handle, constructed to be screwed on the upper end of the spindle $a$. The shape of these respective parts is immaterial, the carrier constructed to receive the articles to be supported thereon usually perforated, and carrying bottles.

As usually constructed, the central opening through the carrier fits closely to the spindle, and rests directly on the shoulder below, so that the bearing is metal to metal, producing the difficulties before mentioned. To avoid these difficulties, the central opening through the carrier is made of larger diameter than the spindle. Then onto the spindle a sleeve, $d$, is set, made of wood or other non-metallic material, its external diameter corresponding to the internal diameter of the opening through the ring. At the shoulder $b$ below, a ring, $e$, of similar non-metallic material, is placed, so that the carrier rests upon this ring, and the entire bearing upon which the carrier revolves is non-metallic. This bearing may be saturated with any lubricating material, and thus make the bearing of the easiest and almost frictionless character.

To hide the ring or collar $e$, the center of the carrier is constructed with a flange, $f$, to extend down over the collar $e$. The flange $f$ may be made either on the base or the carrier.

In the usual construction, the handle is threaded in depth corresponding to the length of the screw on the spindle; hence, as the depth is more or less variable, each handle must be fitted to a particular caster, in order that the carrier may not be bound or left too loose. To avoid this difficulty and make the handles interchangeable, the sleeve $d$ is made longer than the height of the carrier, and so that the lower end of the handle may be turned hard down thereon, and thus not only properly locate the handle, but at the same time rigidly secure the sleeve.

Thus constructed, both the great wear and the objectionable noise are avoided.

We are aware that a non-metallic sleeve to form a bearing, broadly considered, is not new, as such may be found in Patent No. 199,400, granted to Edgar B. Beach, one of these applicants. Therefore no claim is here intended to be broadly made to a non-metallic bearing.

We claim—

1. The combination, in a table-caster, of the base, the spindle rising therefrom, and so as to form a shoulder at its junction with the base, a rotating carrier having its central opening larger than the spindle around which it rotates, and a non-metallic sleeve to fill the space between said spindle and carrier and form the bearing, substantially as described.

2. The combination, in a table-caster, of the base, the spindle rising therefrom, and so as to form a shoulder at its junction with the base, a rotating carrier having its central opening larger than the spindle around which it rotates, and a non-metallic collar, e, on said shoulder, and flange f, to inclose said collar, all substantially as described.

3. The combination of the metallic spindle, rotating carrier, non-metallic sleeve, and handle, when said sleeve is constructed to form the bearing or rest for the handle, substantially as described.

HENRY B. BEACH.
EDGAR B. BEACH.

Witnesses:
 GEORGE N. MORSE,
 WILLIAM FOGARTY.